US 6,557,869 B2

(12) United States Patent
Gillette et al.

(10) Patent No.: US 6,557,869 B2
(45) Date of Patent: May 6, 2003

(54) VERSATILE HAND TRUCK

(75) Inventors: Richard A. Gillette, West Branch, MI (US); Thomas A. Gillette, Linden, MI (US); Nathan J. Hull, Freeport, MI (US); Bruce L. Hailston, Midland, MI (US)

(73) Assignee: Magline, Inc., Pinconning, MI (US)

( * ) Notice: Subject to any disclaimer, the term of this patent is extended or adjusted under 35 U.S.C. 154(b) by 0 days.

(21) Appl. No.: 09/873,688

(22) Filed: Jun. 4, 2001

(65) Prior Publication Data
US 2002/0030351 A1 Mar. 14, 2002

Related U.S. Application Data

(60) Provisional application No. 60/209,933, filed on Jun. 7, 2000.

(51) Int. Cl.[7] .................................................. B62B 1/04
(52) U.S. Cl. ........................... 280/47.28; 280/47.29; 280/652; 414/490
(58) Field of Search ............................ 280/652, 639, 280/654, 43.1, 43.11, 43.12, 33.996, 47.12, 47.131, 47.15, 47.18, 47.19, 47.24, 47.26, 47.28, 47.34, 47.45, 57.33, 79.11; 414/490, 444

(56) References Cited

U.S. PATENT DOCUMENTS

| 363,940 | A | * | 5/1887 | Ash ........................ 280/47.18 |
| 795,147 | A | * | 7/1905 | Magoffin ..................... 187/231 |
| 2,795,433 | A | | 6/1957 | Moriarty |
| 2,827,190 | A | * | 3/1958 | Spitzmesser ................ 187/231 |
| 3,052,323 | A | * | 9/1962 | Hopfeld ....................... 187/231 |
| 3,079,168 | A | * | 2/1963 | Monroe et al. .......... 280/47.28 |
| 3,193,123 | A | | 7/1965 | Wouden |
| 3,278,061 | A | | 10/1966 | Christensen |
| 3,878,958 | A | * | 4/1975 | Ring ........................ 280/47.27 |
| 3,891,102 | A | | 6/1975 | Blount |
| 3,939,999 | A | * | 2/1976 | Nielson .................... 280/47.27 |
| 4,121,855 | A | | 10/1978 | Mortenson |
| 4,179,132 | A | | 12/1979 | Rich |
| 4,185,853 | A | * | 1/1980 | Thurmond, Jr. .......... 280/47.28 |
| 4,728,245 | A | * | 3/1988 | Shelton ..................... 280/47.2 |
| 4,762,333 | A | * | 8/1988 | Mortenson ................ 280/43.1 |
| 4,921,270 | A | | 5/1990 | Schoberg |
| 5,251,922 | A | * | 10/1993 | Mann ......................... 187/244 |
| D354,601 | S | | 1/1995 | Dunkle |
| D357,782 | S | | 4/1995 | Hockenberry et al. |
| 5,474,313 | A | * | 12/1995 | Marquardt ................ 280/47.28 |
| 5,549,317 | A | * | 8/1996 | Dunkle ..................... 280/47.19 |
| 5,599,156 | A | * | 2/1997 | Layne et al. ............. 280/47.28 |
| 5,885,047 | A | * | 3/1999 | Davis et al. ............. 280/47.28 |
| 5,913,527 | A | | 6/1999 | Hailston |
| 5,938,396 | A | | 8/1999 | Audet |
| 5,971,693 | A | * | 10/1999 | Story et al. ................ 414/490 |
| 5,975,826 | A | * | 11/1999 | Scholder ..................... 254/4 R |
| 5,993,134 | A | | 11/1999 | Williamson |
| 6,059,512 | A | * | 5/2000 | Kielinski ................. 280/47.18 |
| 6,131,927 | A | * | 10/2000 | Krawczyk ................ 280/47.27 |
| 6,135,466 | A | | 10/2000 | Irwin |

FOREIGN PATENT DOCUMENTS

| DE | G 92 06 564 | 11/1992 |
| DE | G 92 06 565 | 11/1992 |

* cited by examiner

Primary Examiner—Brian L. Johnson
Assistant Examiner—Kelly E Campbell
(74) Attorney, Agent, or Firm—Reising, Ethington, Barnes, Kisselle, Learman, P.C.

(57) ABSTRACT

A hand truck with a generally upright skeletal frame carried on spaced apart wheels connected with the lower portion of the frame incorporates a noseplate and a pallet-supporting fork structure configured to enter a pallet. The noseplate and fork structure are carried on the frame to be interchangeably movable to and from vertically spaced operative positions projecting forwardly at generally right angles to the lower end of the frame and removed stowed positions generally vertically adjacent the frame.

25 Claims, 12 Drawing Sheets

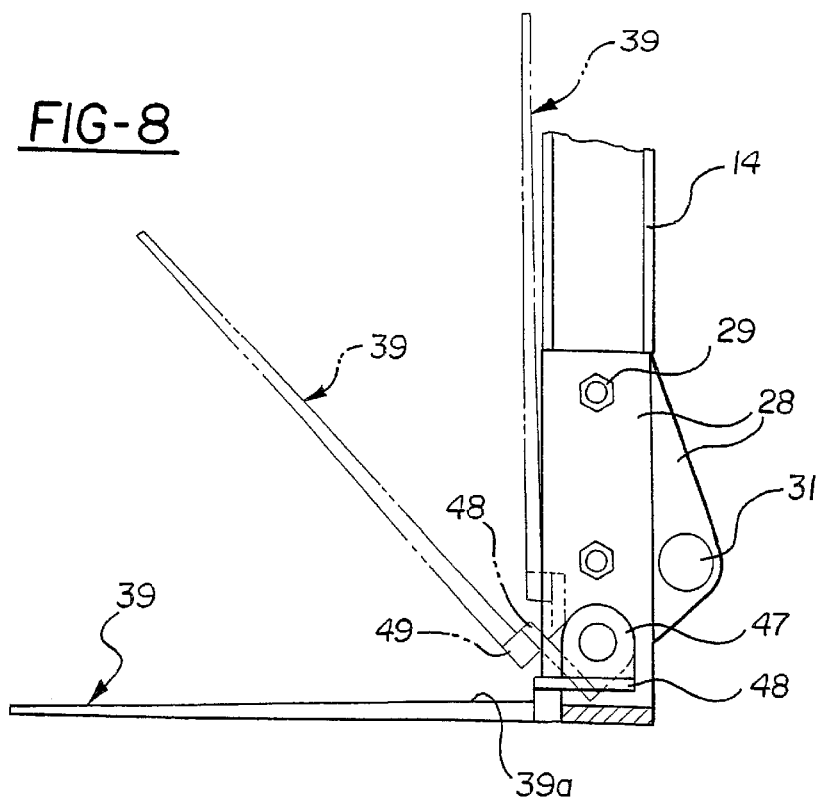
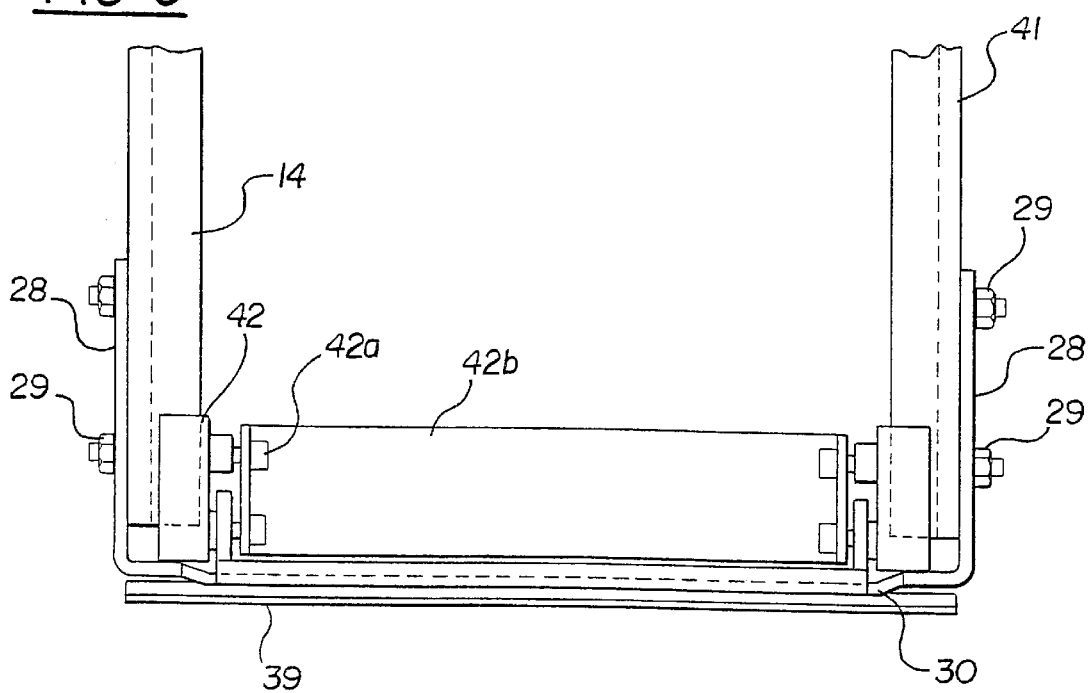

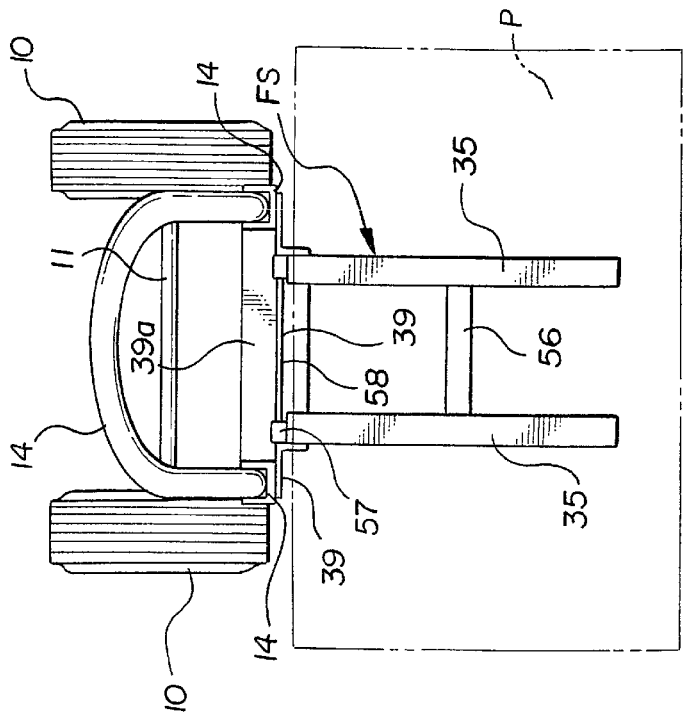
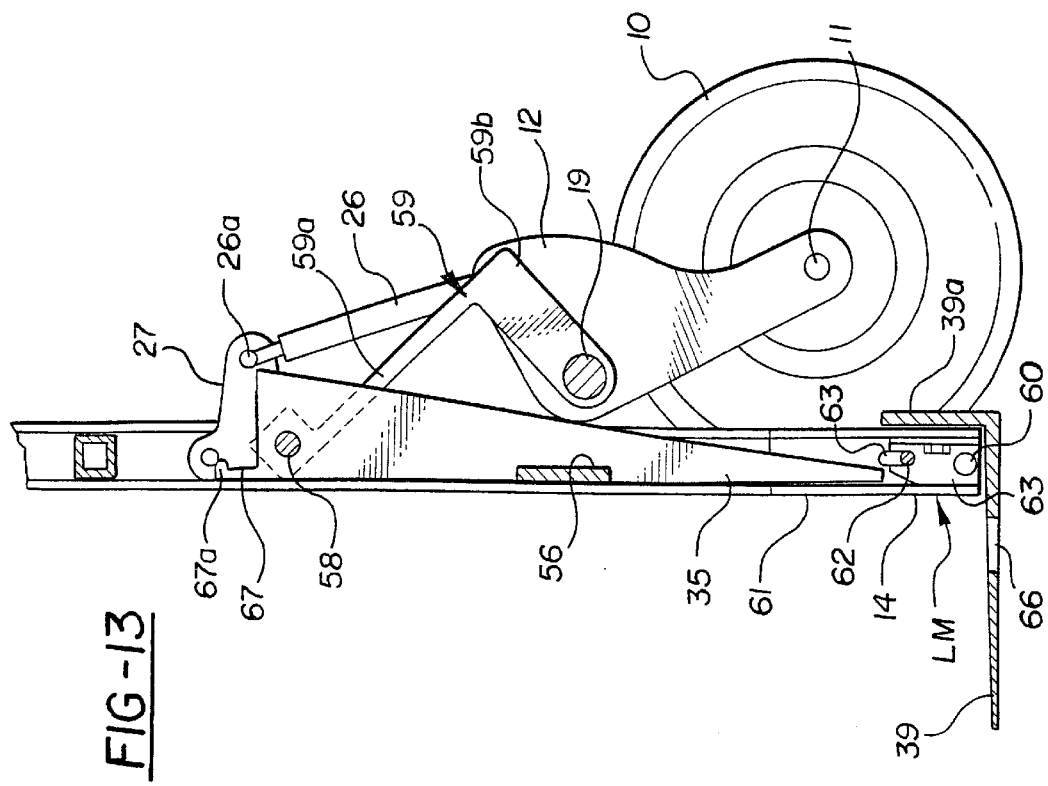

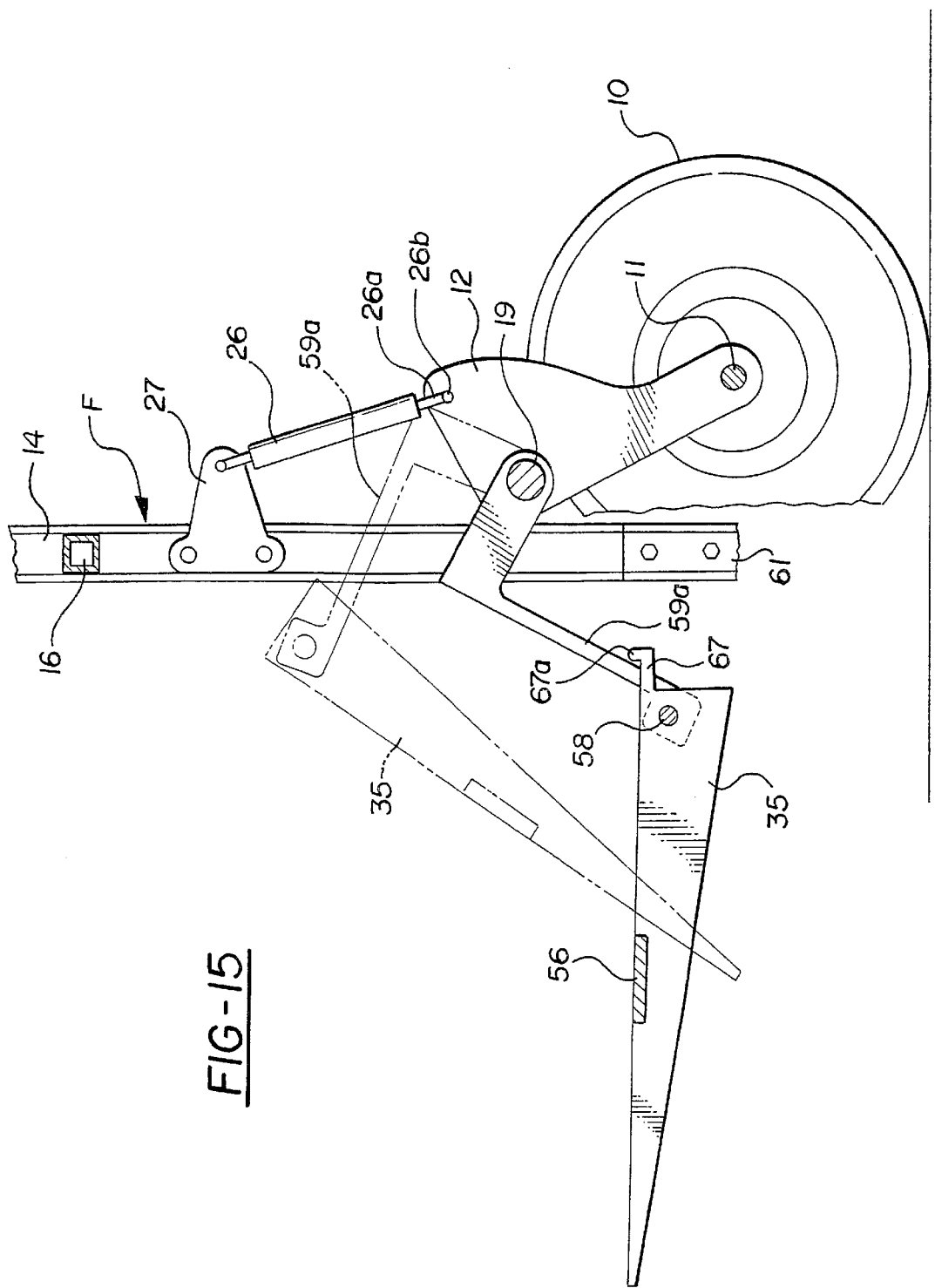

VERSATILE HAND TRUCK

BACKGROUND OF THE INVENTION

This application claims the priority of U.S. provisional application Ser. No. 60/209,933 filed Jun. 7, 2000. The invention relates to certain new and useful improvements in two-wheel hand trucks and particularly hand trucks of the type disclosed in the present assignee's U.S. Pat. No. 4,762,333, although not limited to such hand trucks.

Hand trucks of the type disclosed in the patent are useful when the loads being transported have a wide range of centers of gravity such as, for example, cases of soft drinks and beer supported on pallets, and kegs or barrels. As is well known, pallets are often used for supporting such cases and typically have an upper surface spaced above the floor on which the product loads are preformed according to designated orders. The pallets then must be transported from a warehouse or other processing facility to a delivery vehicle, and then on to the place of business of the retail customer.

The hand truck to be described includes pallet accommodating forks which can be inserted under the load support surface of the pallet. When other products, which do not readily lend themselves to being carried by forks, such as, for example, kegs or narrow gauge cartons are to be carried, the forks can be swung up to an out-of-the-way stowed position and a nose plate, which has been stowed in a raised position, can be moved into product supporting position.

While it is contemplated that the present invention may find use with other types of hand trucks, it is believed that the hand truck described in the patent mentioned, which has a manipulatable wheel structure, which can move from a first position adjacent the lower end of the frame for handling loads with a relatively low center of gravity to a second rearwardly removed position for handling loads with a relatively higher center of gravity, is particularly suited to the tasks described. This design of hand truck is inherently balanced when in operation with the wheel structure in either of the positions mentioned, however, the invention is also applicable to a hand truck whose wheel supporting structure is fixed to the main frame and has only one position.

SUMMARY OF THE INVENTION

The present invention provides a versatile hand truck in which a pallet supporting blade device or fork structure and a nose plate may be alternatively and optionally used as the load carrying surface. One of the fork and nose plate structures is pivotally mounted to the lower end of the hand truck frame to be swung upwardly from a position substantially at right angles to the frame to a position rearwardly of the front of the frame. The other of the fork and nose plate structures in one version of the invention may be mounted for both pivotal and upward sliding movement along the frame to a remote storage position out of the path of swinging movement of the first mentioned support member. In another version of the invention, the fork member is mounted for swinging movement from a stowed position generally between the side rails of the frame to an operative position extending forwardly above the operative position of extension of the noseplate.

Other objects and advantages of the invention will be apparent by reference to the following specification and to the drawings.

THE DRAWINGS

The presently preferred embodiment of the invention is disclosed in the following description and in the accompanying drawings, wherein:

FIG. 8 is an enlarged schematic fragmentary sectional side elevational view of a portion of the lower end of the hand truck frame only, illustrating several positions of the nose plate, the forks again being omitted;

FIG. 9 is a schematic fragmentary front elevational view thereof;

FIG. 13 is a similar view with the fork blades in stowed position and the nose plate in operative position;

FIG. 14 is a schematic top plan view with the fork blades in operative position shown supporting a pallet which is illustrated in chain lines;

FIG. 15 is a schematic fragmentary sectional side elevational view with the fork blades being shown in the process of moving to stowed position;

DETAILED DESCRIPTION OF THE DRAWINGS

Figure 1:
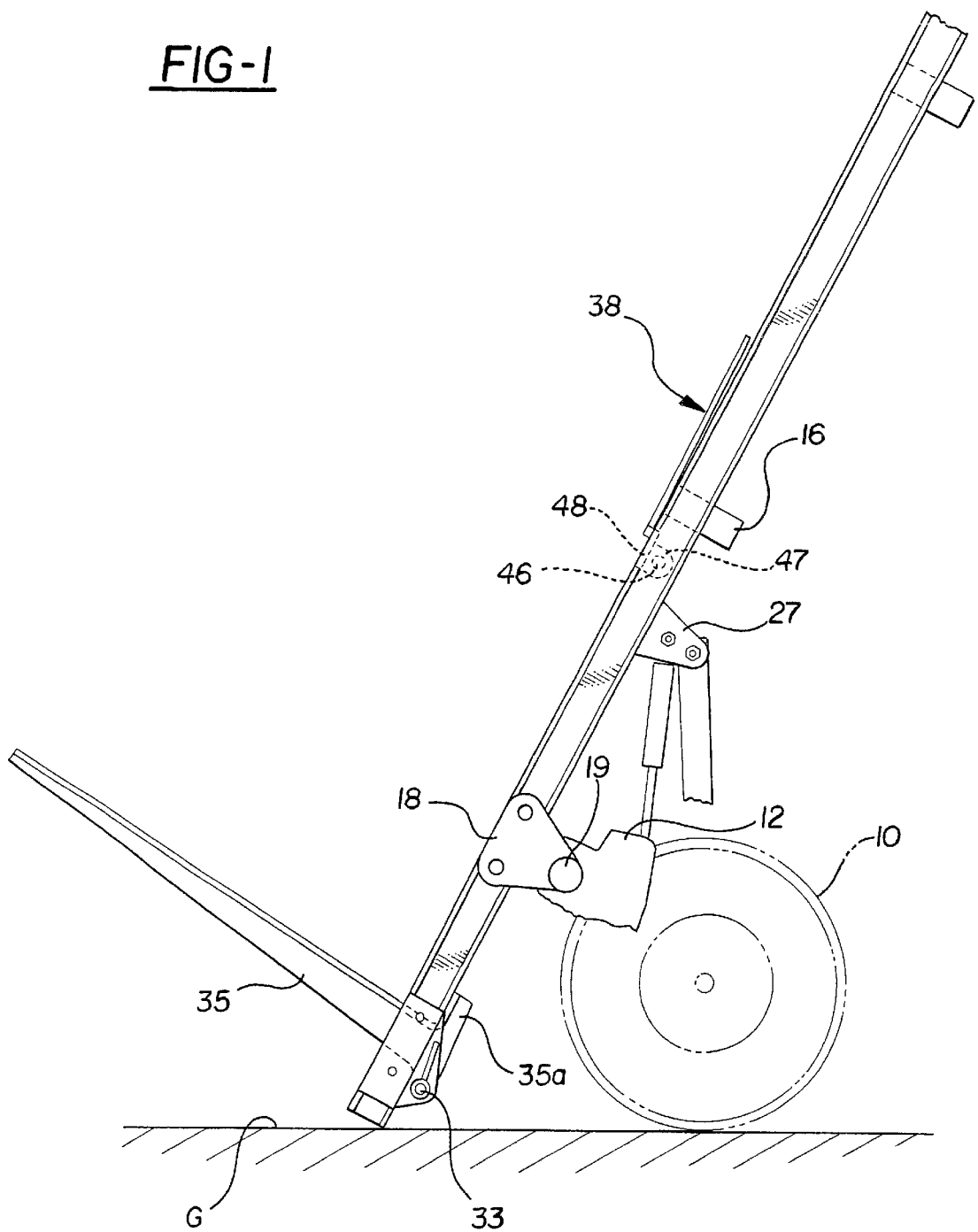
FIG. 1 is a fragmentary, schematic side elevational view of a hand truck with the forks shown in operative pallet carrying position and the nose plate in a raised stored position.
Figure 2:
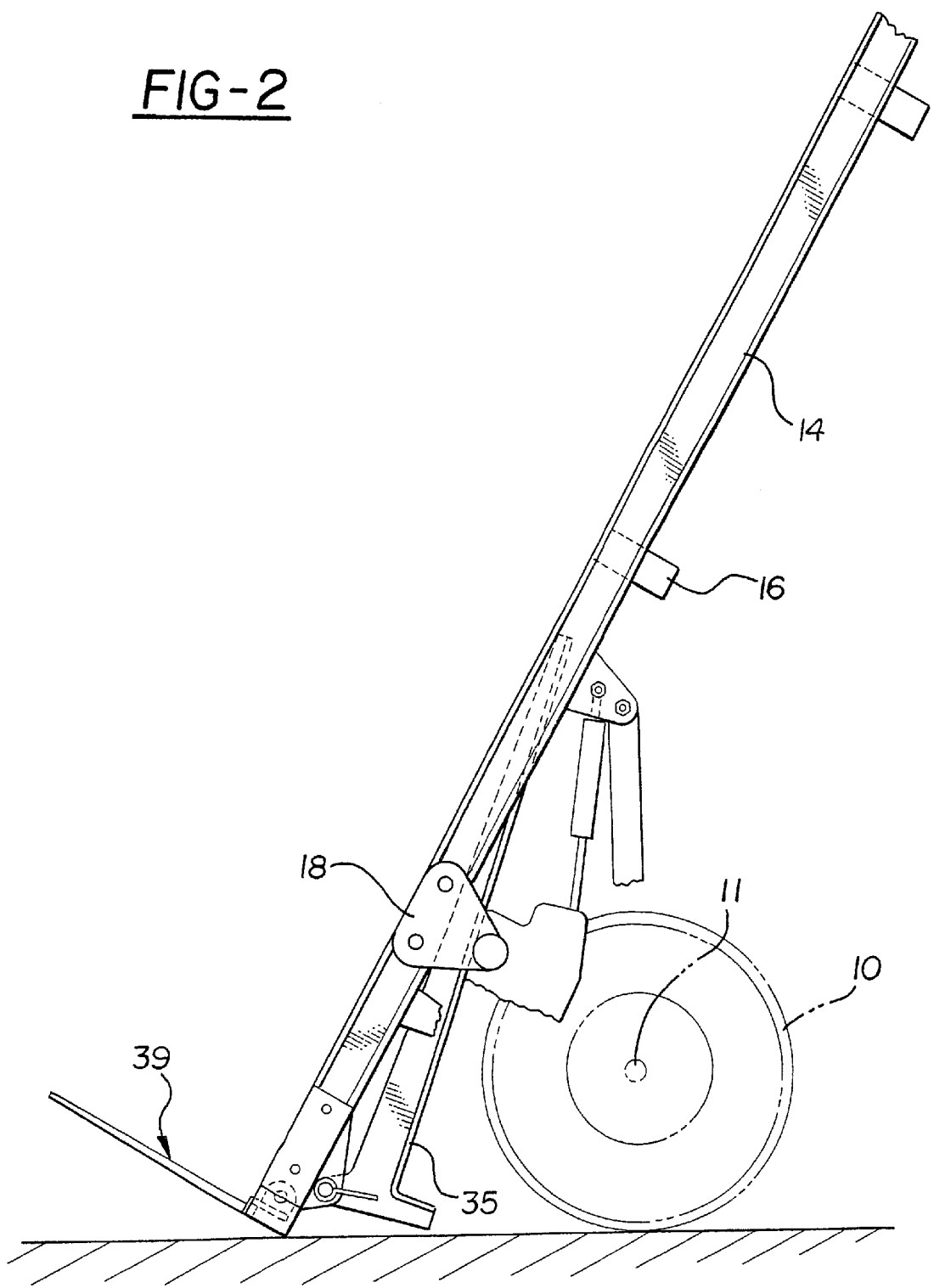
FIG. 2 is a similar schematic side elevational view with the nose plate shown in operative position and the fork structure shown moved to an inoperative stored position.

Referring now more particularly to the accompanying drawings, FIGS. 1–11, the hand truck illustrated is of the type disclosed in U.S. Pat. No. 4,762,333 which I incorporate herein by reference. It comprises rubber-tired wheels 10, rotatably mounted on a dead axle 11. Side brackets, generally designated 12, and fixed to dead axle 11, extend forwardly from the axle 11 toward a generally rectangular open hand truck frame, generally designated F. The skeletal frame F has parallel vertical side rails 14, which may be formed of extruded aluminum in a predetermined configuration. Handles such as shown in the aforementioned patent or a composite handle may be fixed to the upper ends of the side rails 14 which are connected by vertically spaced spanning braces in the usual manner. In plan, the braces may be curvilinear in configuration as shown at 16 in FIG. 5 to partially embrace the curvilinear surface of a keg or barrel.

Provided to pivotally connect the brackets 12 to the frame side rails 14 are mount plates 18 which may have key portions 18a received in the usual exterior vertical grooves 14a (FIG. 6) provided in the exterior side faces of the channel-shaped rails 14. Plates 18 may be mounted in position by screws or bolts 20 at a level spaced vertically from the lower end of the frame F vertically above the axle 11 in either illustrated position of the wheels 10. At a spaced distance rearwardly of the side rails 14, each mount plate 18 carries an end of a fixed shaft 19 which extends between the plates 18. While not specifically shown, the opening 12a in each bracket 12 may receive a tubular sleeve which is received on the shaft 19 and can pivot with respect to it, the brackets 12 being welded or otherwise suitably affixed to the ends of the sleeve. A further description of the two different positions of the wheels 10 and of the gas cylinders 26 which pivotally connect to ears 27 on each side rail 14 to releasably lock the brackets 12 in each of the positions, is unnecessary in view of the explanation provided in the aforementioned U.S. Pat. No. 4,762,333.

As particularly shown in FIGS. 1–11, the fork structure, generally designated FS, includes a generally U-shaped mounting bracket 28 (FIG. 4) which has end parts 28a secured to the lower end of each rail 14 by bolts or fasteners 29, and includes a frame spanning portion 30. As FIGS. 10 and 11 particularly indicate, the portions 28 of the bracket carry fasteners 31 mounting members 32 from which protrude trunnions 33. Tubular sleeves 34, to which fork legs 35 are fixed, have end parts 34a receiving the trunnions 33, and interposed between the sleeves 34 and members 32 are spring washers 36 which frictionally resist free rotation of the sleeves 34 on trunnions 33.

Figure 3:
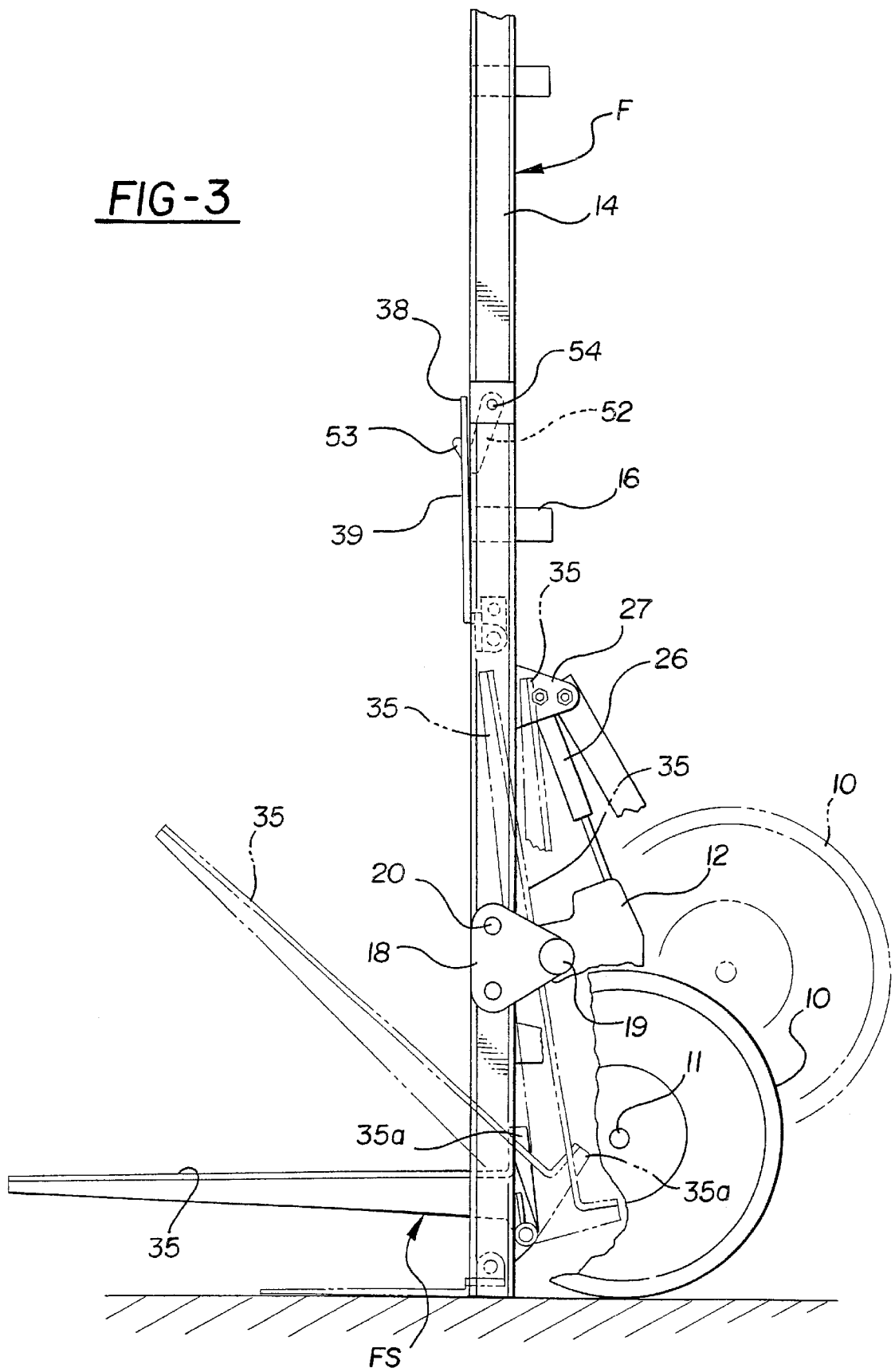
FIG. 3 is a side elevational view of the hand truck in an upright position ready for the forks to be extended below a pallet product support surface, the chain lines indicating other positions of the forks and the nose plate being shown in stowed position in solid lines and in operative position in broken lines.

As FIGS. 1 and 3 in particular well illustrate, the forks 35 have perpendicularly extending backer walls 35a which extend vertically when the forks are in the operative lifting position to engage and brace against the rear faces of side rails 14. As FIG. 3 indicates, the forks 35 can be swung upwardly to the stowed inoperative position shown in diagrammatic lines in FIG. 3 and are shown in this stowed position in FIG. 4. FIG. 5 shows the position of the forks when they are moved forwardly to engage under the raised load support surface 38 of a typical pallet P having dependent members L supported on the ground or other surface G.

Also carried by the hand truck frame F is a nose or nose plate, generally designated 39, which is shown in several positions in FIG. 8 and in stowed position in FIGS. 1 and 3. The side rails 14 are generally channel-shaped in cross-section to provide interiorly facing recesses 14b, as shown particularly in FIGS. 10 and 11, and integrally provided within the recesses 14b are elongate vertical guide members 40 which may bolt in place as at 41. The guides are preferably constructed of a high molecular weight plastic material which has a slick surface. Provided to slide vertically within the slide guides 40 at each side of the hand truck are laterally protrudent slide members 42 which may be fabricated of the same plastic material and are apertured as at 43 so that they may slide upwardly and downwardly in guides 40 without contacting the heads of bolts 41. At their inner ends, the stems 44 of the slides 42 are provided with openings 45 to receive trunnion pins 46 which are provided in side plates 47 fixed on plates 48 which are attached by means of members 49 to the load support plates 39a of the nose plates 39. Also connected to slides 42, as by bolts 42a, is a back plate 42b which moves with slides 42.

Spring washers, such as beveled washers, i.e., Belleville washers or the like, are shown at 50 and 51 as operating to frictionally resist turning movement of the trunnions 46 to thereby tend to maintain the nose plate 39 in either the operable swung down position in which it is shown in FIG. 8 or the vertical stowed position in which it is shown in FIGS. 1 and 3. In FIG. 8, the nose plate 39 is shown in solid lines in operative position and then in broken line positions as it is swinging to the vertical position, ready to be moved in vertical translation upwardly to a position above the forks 35 to the stowed position shown in FIG. 1.

Figure 4:
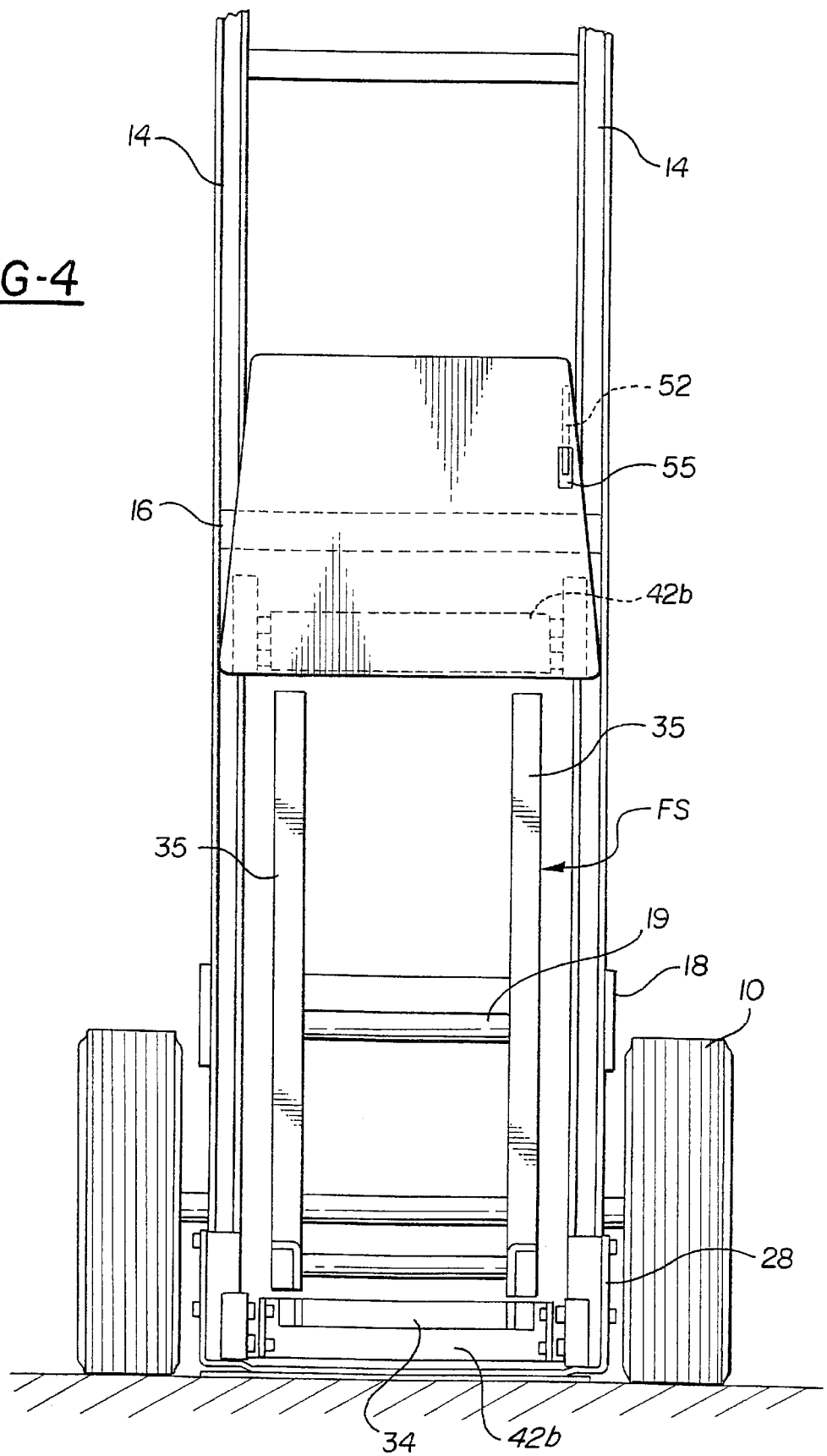
FIG. 4 is a schematic front elevational view with the nose plate in down position and the forks in raised position, the stowed position of the nose plate being indicated in broken lines.
Figure 5:
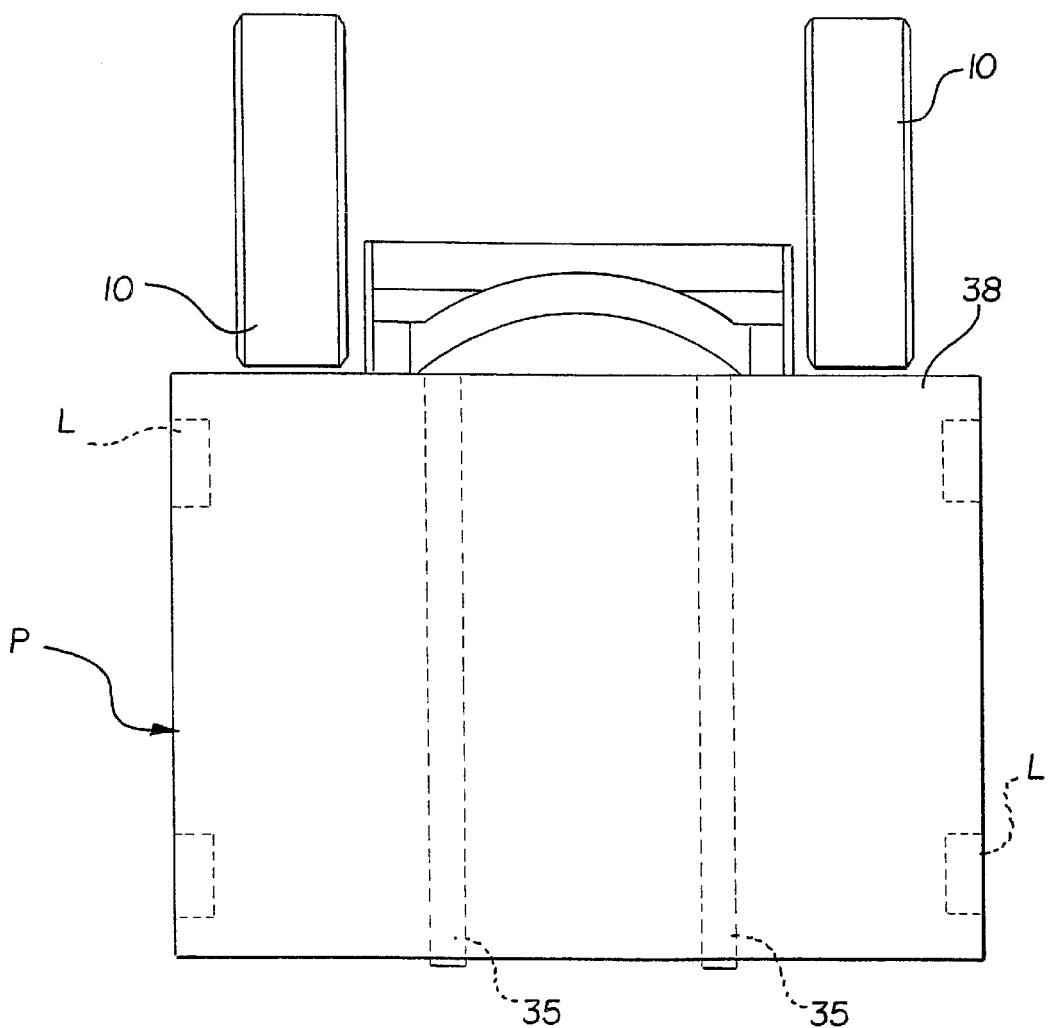
FIG. 5 is a schematic top fragmentary plan view showing a typical pallet and showing the forks in chain lines as extended in under the top surface of the pallet.
Figure 6:
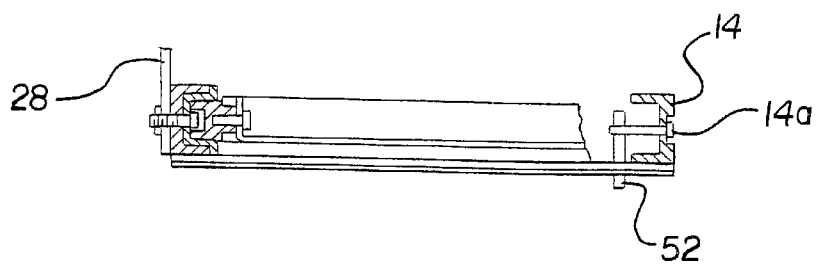
FIG. 6 is a schematic fragmentary sectional plan view on a reduced scale illustrating the manner in which the nose plate is held in the raised inoperative position.
Figure 7:
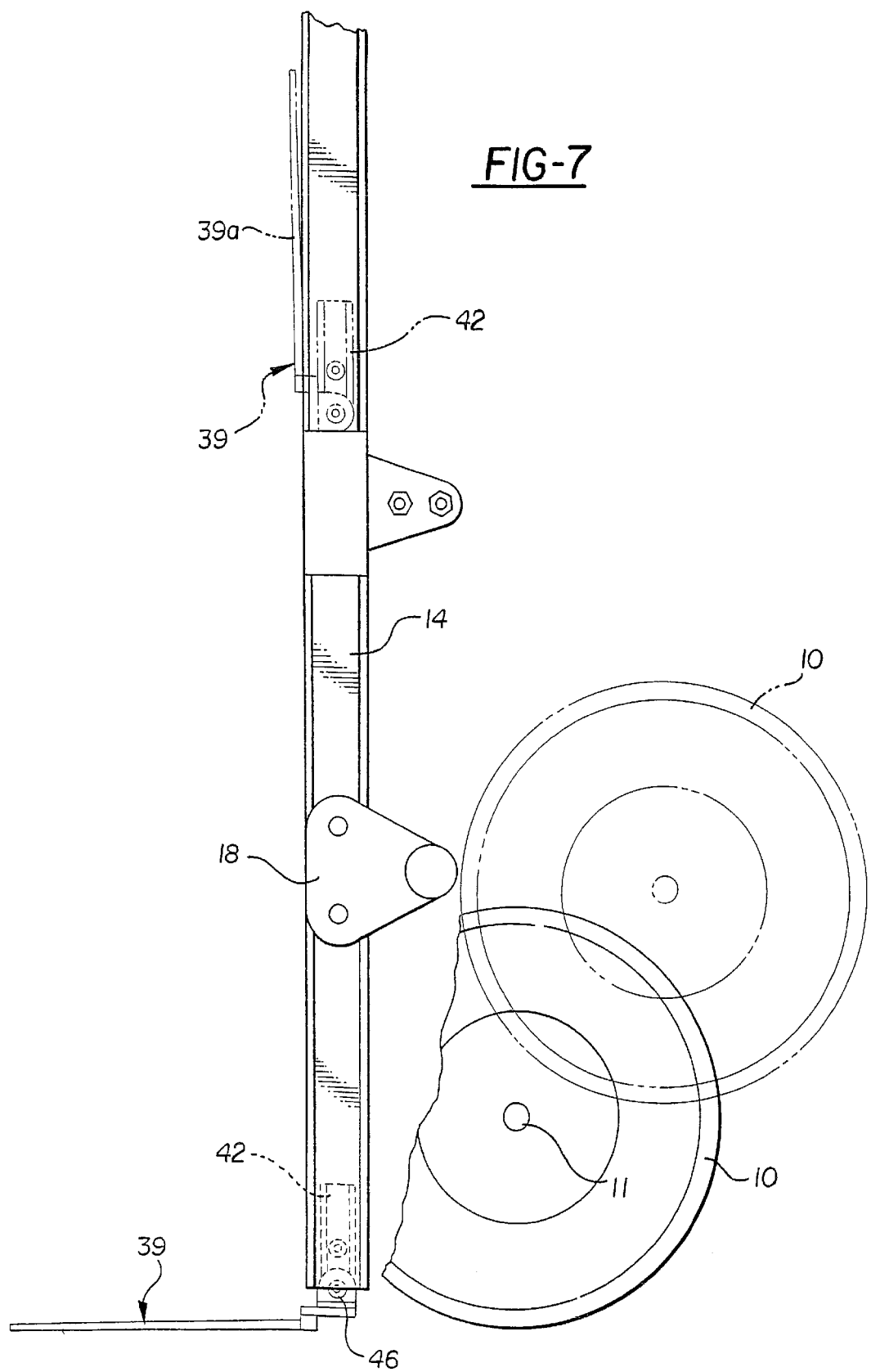
FIG. 7 is a fragmentary schematic side elevational view of the hand truck frame with the nose plate in down position, the forks being omitted from the view in the interest of clarity and the spread position of the wheels being indicated in chain lines.
Figure 11:
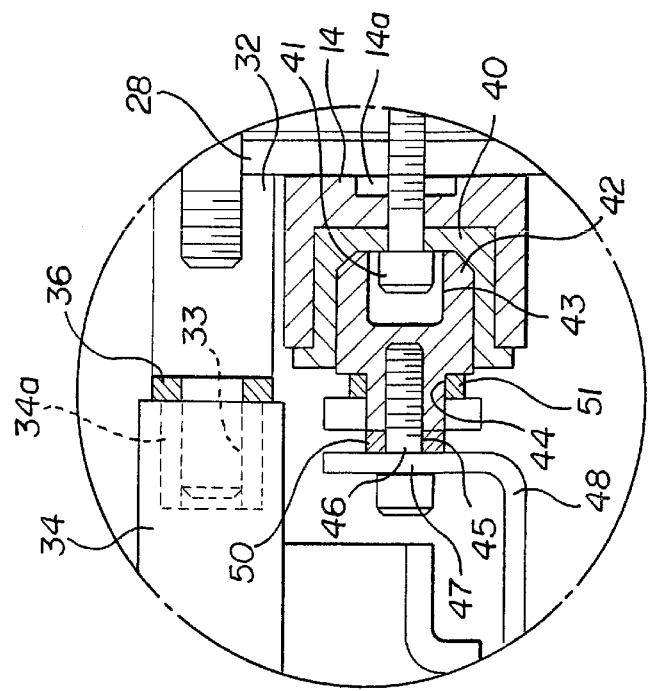
FIG. 11 is a considerably enlarged view of the mechanism within circle 11 on FIG. 10.
Figure 10:
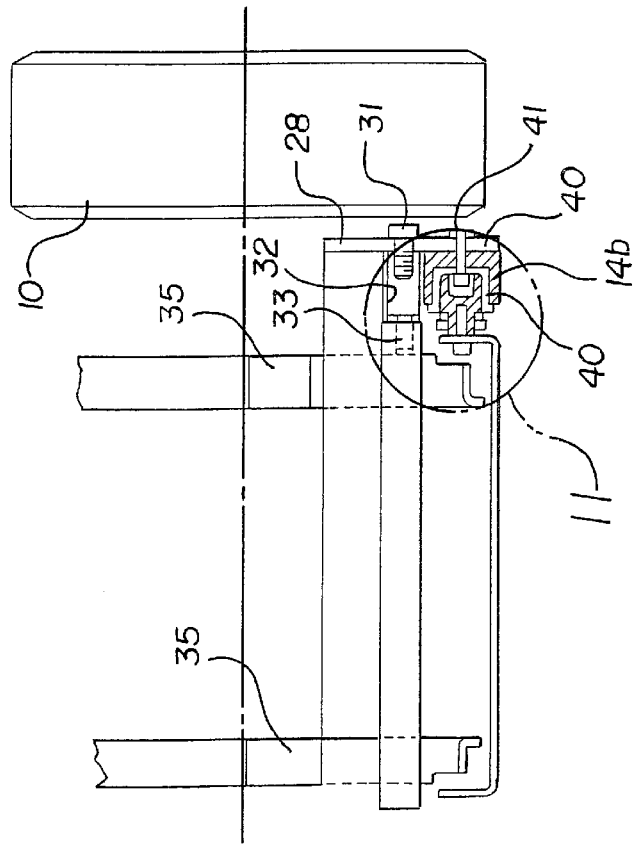
FIG. 10 is a schematic fragmentary top plan view of a portion thereof.

As shown particularly in FIGS. 4 and 6, hook members or latch pawls 52, which have upturned hook ends 53, may be pivoted to the side rails as at 54 and, when the nose plates 39 are in the vertical stowed position, as shown in FIG. 4, the ends 53 extend through slots 55 provided through the nose plate 39 to latch the nose plate 39 in stowed position. The weight of the nose plate bearing down on the pawl members 52 supports the nose plate in the stowed position because the plates 39 engage against the front wall surfaces of the side rails 14 and prevent the members 52 from pivoting rearwardly.

THE OPERATION

It is to be understood that forks 35 are moved under the support surface 38 of the pallet P by simply moving the hand truck forwardly when the hand truck is in the FIG. 3 position. When the forks 35 are engaged under the pallet surface 38, the hand truck is tipped back to the FIG. 1 position for transport. With high center of gravity loads, the wheels 10 can be adjustably moved in the manner disclosed in U.S. Pat. No. 4,762,333 to the spread position. The forks 35 are prevented by way of engagement of the parts 35a and 14 from swinging below the horizontal position in which they are shown in FIG. 3. In this position of its parts, the hand truck has its nose plate 39 in the upper stowed position disposed flatwisely against the front faces of side rails 14. When it is desired to transport other products, such as kegs or drums, fork assemblies 35 are swung to the upper stowed position shown in FIGS. 3 and FIG. 9, and pawls 52 are manually swung rearwardly to disengage from the nose plate assembly 39. The nose plate is then permitted to move downwardly with slides 42 along the front faces of side rails 14 until it reaches the vertical position shown in FIG. 8, whence it may be swung downwardly to the operative horizontal position shown in FIGS. 2 and 8. The nose plate 39 is then moved under the product to be transported. If the load is a high center of gravity load, the wheels 10 may be moved to the spread position disclosed in U.S. Pat. No. 4,762,333.

DESCRIPTION OF ANOTHER EMBODIMENT

A further embodiment is disclosed in FIGS. 12–17 in which the same numerals will be used to identify the same or very similar components for the sake of clarity.

As previously, the hand truck comprises rubber-tired wheels 10, rotatably mounted on a dead axle 11. Side brackets 12 fixed to the dead axle 11 extend forwardly from the axle 11 toward a generally rectangular skeletal truck frame, generally designated F. The frame F has parallel generally vertical side rails 14 with a handle H fixed to the upper ends of the side rails 14, which may be connected by laterally extending spanning braces 16.

Provided to pivotally connect the axle brackets 12 to the frame side rails 14 are mount plates 18 which may have key portions received in the exterior vertical channels provided in the exterior side faces of the channel-shaped rails 14 in the usual manner. The plates 18 may be mounted in position by suitable bolts.

Rearwardly of the side rails 14, each bracket 12 carries an end of a fixed shaft 19, which extends between the plates 18. While not particularly shown, the opening in each bracket 12 may receive a tubular sleeve, which is received on the shaft 19 and can pivot with respect to it.

As previously, the wheels 10 have two different positions and the gas cylinders 26, which pivotally connect to brackets 27 on each side rail 14, releasably lock the brackets 12 in each of the positions as previously. The piston rods 26a of cylinders 26 pivotally connect to the brackets 12 at 26b, and the cylinders 26 pivotally connect to bracket 27 at 27b. Since the mechanism for moving the wheels 10 to the two different positions forms no part of the present invention, these components will not be further described. Any further explanation of the gas cylinders 26 and how they are operable in either of the two positions which the wheels 10 may assume, as disclosed in U.S. Pat. No. 4,762,333, is unnecessary, since this structure forms no part of the present invention.

As particularly shown in FIGS. 12–17, the fork or blade structure in the second embodiment, generally designated FS, includes fork legs 35 connected by a spanning brace 56 which compositely may also be referenced as a blade device for engaging under the top support surface of the pallet P in the normal manner. At their rear ends, the fork or blade members 35 are connected by a shaft 58 which is pivotally mounted by a bell-crank like fork or blade structure mount, generally designated 59. The pivot shaft 58 is received within journals carried on the bell-crank arms 59a. The opposite end of bell-crank 59, comprises legs 59b extending at right angles to the legs 59a which are pivotally received on the shaft 19.

Figure 12:
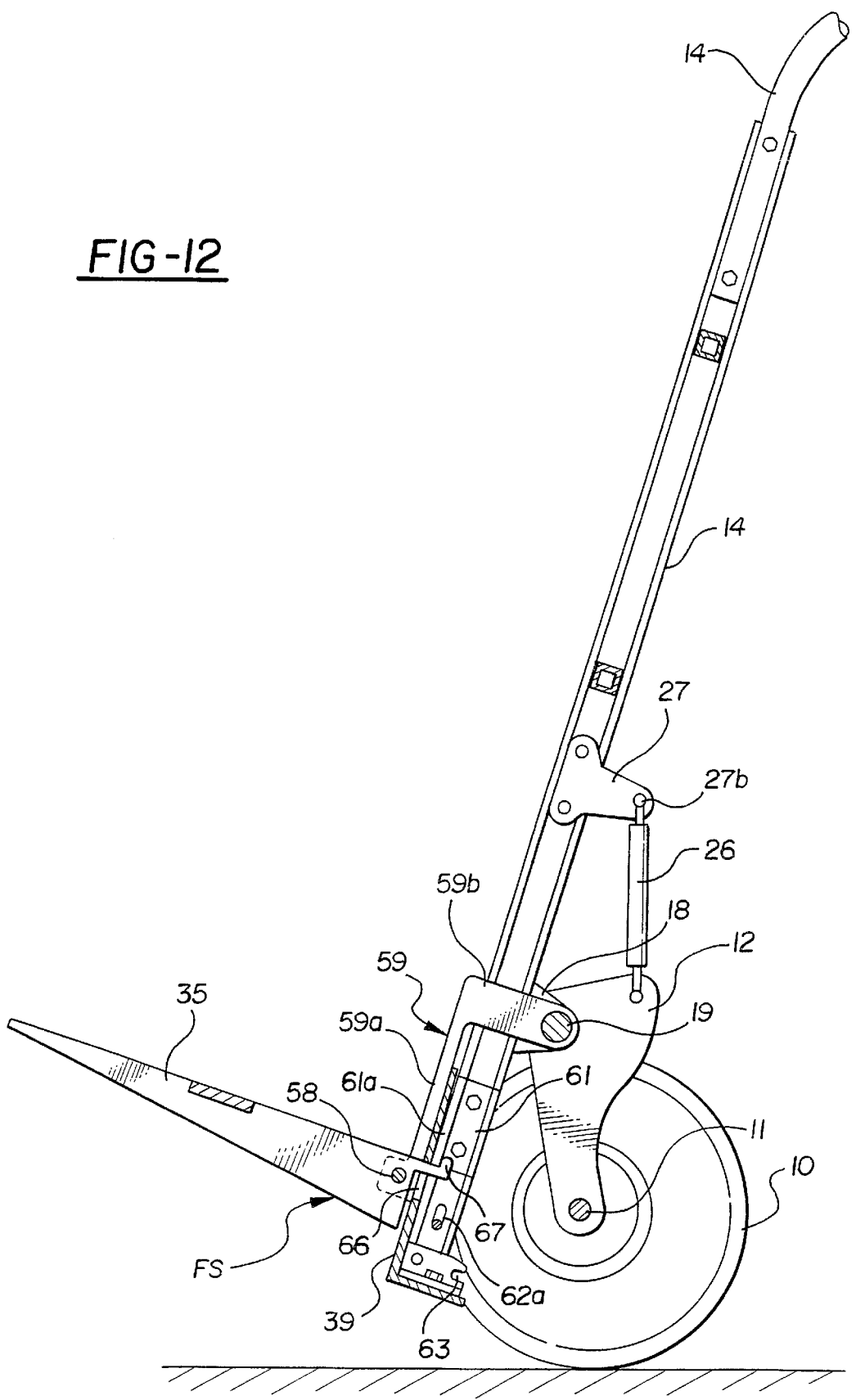
FIG. 12 is a partly sectional fragmentary side elevational view of another embodiment, the fork blades being shown in operative position and the nose plate in stowed position.

The nose plate 39 is pivotally mounted to swing upwardly to a position in engagement with the front faces of the side rails 14, as indicated in FIG. 12, for example. Nose plate 39 is pivotally mounted on the lower ends of the side rails 14 on pivots 60 to swing from the position shown in FIG. 13, in which the nose plate back 39a lies vertically adjacent the side rails 14 to the position shown in FIG. 12 in which it lies horizontally beneath the side rails 14.

On the lower end of each of the rails 14 is a latching mechanism for both the nose plate 39 and the fork structure FS. This latching mechanism, generally designated LM, includes an inwardly facing channel-shaped plate 61 secured to the side rails by bolts 61a which carries a locking rod, designated 62. The ends of the rod 62 may be carried in vertically elongate slots 62a in plate 61.

Angle brackets, generally designated 63, and secured by bolts 64 to the nose plate back member 39a are upwardly slotted as at 63a to receive the locking rod 62, and it is only when the rod 62 is moved upwardly of brackets 63 in the slots 62a that nose plate 39 is free to pivot about its pivots 60 and swing up into vertical engagement with the side rails 14. When the nose plate 39 is swung downwardly, once again, to a horizontal operative position, the rod 62, when released, falls by gravity into the slots 63a to positively restrain movement of the nose plate 39.

Figure 17:
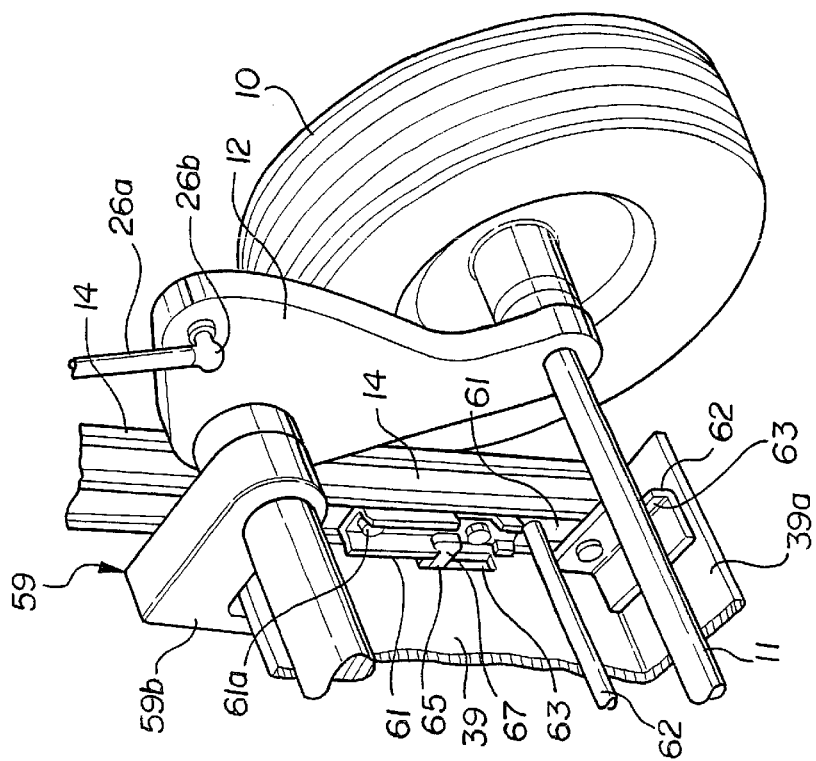
FIG. 17 is a fragmentary perspective rear elevational view illustrating latching mechanism for releasably holding the fork blades in operative position.
Figure 16:
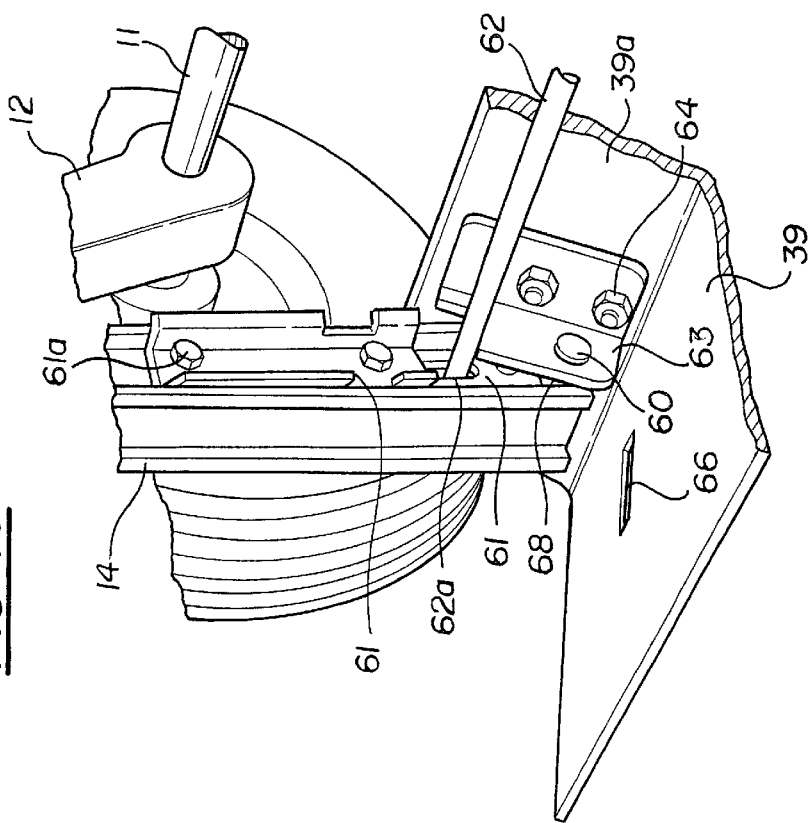
FIG. 16 is a fragmentary perspective front elevational view illustrating the releasable latching mechanism for holding the nose plate in operative position.

As FIGS. 16 and 17 indicates, the front side wall 61a of the plate 61 is elongately slotted as at 65 and the nose plate 39 is elongately slotted as at 66. Provided to extend from the rear ends of fork blades 35 are upwardly disposed L-shaped hook members 67 which, when the fork blades 35 swing down to the generally horizontal operative position pass through the slots 66 in the swung-up nose plate 39 and engage under the marginal ledge or wall of the locking slot 65, as shown in FIG. 17, 50 that hook wall 67a is disposed rearwardly of and embraces the rear face of side wall 61b of the plate 61. This latching occurs automatically when the fork leg structure FS swings down to the generally horizontally disposed operating position. To unlatch the blade or fork structure FS, it is first necessary to lift the front end of a fork leg 35 to pivot the latch hooks 67 down to a position to clear wall 61b as the fork structure FS is moved forwardly and upwardly.

It is the brackets 63 secured to the nose plate 39 which mount the nose plate pivot pins 60, there being spring or Belleville washers mounted on the pins 60 between the bracket walls 68 and the side rails 14 to provide initial resistance to upward pivoting of the nose plate 39.

The Operation of the Second Embodiment

As FIG. 13 indicates, the hand truck may be operated in the normal manner with the nose plate 39 locked in position by locking rod 62. In FIG. 13, the forks 35 are shown folded downwardly about pin 58 to their stowed position, generally within the lateral footprint of the side rails 14 so that they do not interfere with the transport of desired products lying against the side rails 14. When a pallet P is to be lifted, however, the shorter nose plate 39, which is disposed at the lower ends of rails 14 in operative position, will not be suited to the task. To interchangeably move the fork structure FS to operating position, it is necessary to first lift the nose plate locking rod 62 out of slots 63a so the nose plate 39 can then be swung up to the vertical position shown in FIG. 17. When this is accomplished, the fork legs 35 can be grasped and moved forwardly to start the pivoting of the bell-crank structure 59 about shaft 19. Once the portions 59a of the bell-crank 59 reach a horizontal position and move lower, the off-set weight of the rear ends of the fork members 35 swings the pivot shaft 58 about the mount 59 to the horizontal position, and when portions 59b reach vertical position, the lock members 67 have swung under the ledges provided by walls 5ib and hook behind them. With the fork structure FS in locked position, the fork members 39 may enter a pallet and lift it and transport it in the usual manner of a fork truck. The fork structure is operative when the pallets comprise simply a top wall supported on legs, or when the pallets have vertically spaced upper and lower walls between which the forks 35 can be inserted.

The manner of restoring the fork structure FS to stowed position by initially lifting the forks 35 and swinging the bell-crank 59 rearwardly has been described and will not be repeated. The nose plate 39 may, as earlier described, be swung down to operative position when the locking rod 62 is lifted and then permitted to fall into the slots 63a when the nose plate reaches operative position. Plainly, existing hand trucks in the field may be readily retrofitted with the nose-plate and fork structure components.

The construction disclosed provides a versatility permitting use of either the forks or the nose plate interchangeably with the wheels in either position of adjustment, or with a hand truck having simply wheels which have no positions of adjustment.

It is to be understood that other embodiments of the invention which accomplish the same function are incorporated herein within the scope of the following patent claims.

We claim:

1. In a versatile hand truck comprising a generally upright skeletal frame having laterally spaced and connected side rails with front and rear faces and laterally inner and outer side faces, the frame having an upper handle surface and being carried on spaced apart wheels connected with the lower portion of the frame, the improvement wherein:
   a. a noseplate and a separate pallet-supporting blade structure configured to enter a pallet are each separately movably carried on said frame to be interchangeably movable to and from vertically spaced operative positions projecting lengthwisely forwardly from the lower end of said frame at generally right angles thereto and inoperative stowed positions generally vertically adjacent said frame; said supporting blade structure in operative position extending forwardly at a predetermined spaced distance above the forwardly extending operative position of said noseplate throughout the length of said blade structure in position to enter a pallet above the lower surface of the pallet.

2. The hand truck of claim 1 wherein said noseplate and blade structure are each swingably carried to swing from said operative position to lie alongside said frame.

3. The hand truck of claim 2 wherein one of said noseplate and blade structure is mounted to slide upwardly on said frame to a raised position upward of the upward swing path of the other.

4. The hand truck of claim 3 wherein said one of said noseplate and blade structure is the noseplate.

5. The hand truck of claim 4 wherein laterally spaced slide members pivotally mount said noseplate and said side rails have track surfaces receiving said slide members for up and down sliding movement, and wherein latch mechanism carried on said frame is operable to hold said noseplate in said raised position.

6. The hand truck of claim 5 wherein said fork device is of a reduced lateral width relative to said noseplate to pass swingably between said side rails, said side rails having mount plates on said side rail outer faces which have portions projecting rearwardly from said side rails, said portions of said mount plates on said side rails having mechanism pivotally mounting said fork devices for swinging movement about an axis positioned rearwardly of and above said pivotal axis of said noseplate.

7. The hand truck of claim 5 wherein said frame is metallic and said slide members and track incorporate synthetic plastic slide surfaces providing less functional resistance to sliding movement.

8. The hand truck of claim 5 wherein said latch mechanism comprises a hook with a shank pivotally mounted on one of said side rails above said track surfaces and with an upturned hook end, said noseplate having an opening positioned so as to be interengaged with said hook end when said noseplate is swung vertically to substantially engage said front faces of said side rails.

9. The hand truck of claim 2 wherein said side rails carry brackets for mounting a shaft which extends between said brackets rearwardly of said side rails and said blade structure includes a bell-crank mount having arms pivotally mounted by said shaft and having ends extended outwardly therefrom, said mount also including a support extending angularly from said ends of said arms with outer ends having pivot mechanism thereon, said blade structure comprising forks pivotally carried on said outer ends of said mount support, and releasable mechanism for locking said blade structure in a position extending generally perpendicularly to said mount support.

10. The hand truck of claim 9 wherein said releasable mechanism comprises rearwardly extending hooks on said forks and latch bars fixed on said inner faces of said side rails under which said hooks engage to prevent downward swinging of said forks while permitting delatching swinging of said forks and mount.

11. The hand truck of claim 1 wherein said one of said nose plate and blade structure is said blade structure and said blade structure includes a pivotal mount having a front support end swingable upwardly from a lowered position when said blade structure is in said operative position to a remote position rearward of said front faces of said frame side rails and a blade device pivotally mounted on said front end of said pivotal mount to fold downwardly to a removed position generally vertically adjacent said side rails when said mount reaches said stowed position.

12. The hand truck of claim 11 wherein interacting latch mechanism on said rear end of said blade device and said frame side rails is engageble when said blade device is returned upwardly from said removed position to said forwardly extending position and said mount is returned from said remote position to said lowered position.

13. The hand truck of claim 12 wherein initial upward pivoting movement of said blade device disengages said latch mechanism so that said mount can swing upwardly and said blade device downwardly.

14. The hand truck of claim 11 wherein said mount comprises an angular bell-crank structure having pivot arm structure with ends pivoted to said frame rearward of said side rails and laterally inward thereof, and a blade device mounting arm structure extending angularly thereto and having blade device mounting ends with pivot mechanism thereon.

15. The apparatus of claim 1 wherein said locking mechanism comprises a latch portion for said blade structure interactive with a latch surface on said frame.

16. The apparatus of claim 1 wherein said locking mechanism includes members on said blade structure extending rearwardly past said noseplate, when the noseplate is in generally vertically disposed stowed position, to interact with said side rails.

17. A versatile hand truck comprising:
   a. a generally vertical frame having laterally spaced and connected side rails with front and rear faces and laterally inner and outer faces, the frame having an upper handle surface and being carried on spaced apart wheels disposed rearwardly of said side rails and connected with the lower portion of the frame;
   b. a nose plate extending in operative position generally forwardly from said lower end of said frame generally perpendicularly thereto;
   c. a pallet supporting blade structure configured to be engaged under a pallet support surface having an operative position extending generally forwardly from said lower end of said frame a spaced distance above said operative position of said nose plate; and
   d. mount mechanism mounting said blade structure for swinging movement upwardly while permitting said blade structure to fold downwardly to lie vertically alongside said side rails.

18. The hand truck of claim 17 wherein said nose plate is pivotally mounted on said side rails to be swingable to a stowed position against said side rail front faces, and said mechanism mounting said blade structure carries a pivot device permitting said blade device to fold down against said stowed nose plate.

19. The hand truck of claim 18 wherein latch mechanism is engageable to hold said nose plate and said blade structure interchangeably in operative position.

20. The hand truck of claim 17 wherein said mechanism mounting said blade structure comprises a bell crank pivotally carried at one end by said frame and pivotally carrying said blade structure at the other.

21. A method of operating a hand truck comprising a generally upright frame having laterally connected side rails, with front and rear faces and laterally inner and outer side faces, carried on spaced apart wheels rearward of the lower end of the frame, the hand truck further having a nose plate connected to the lower end of the frame to move from a stowed position generally alongside the frame to an operative position extending generally perpendicularly to the frame, the hand truck further having a pallet supporting fork structure mounted to move from a stowed position alongside said side rails to an operating position generally extending forwardly perpendicularly to said frame and spaced above said operative position of the nose plate; comprising:
   a. with the fork structure in operative position and the nose plate in stowed position, moving the fork structure to stowed position; and
   b. then moving the nose plate to operative position.

22. A method of constructing a hand truck which is comprised of a generally upright frame, having laterally connected side rails with front and rear faces and laterally inner and outer side faces, carried on spaced apart wheels rearward of the lower end of the frame, comprising:
   a. pivotally connecting a nose plate to the lower end of the frame to move from a stowed position generally vertically alongside the frame to an operative position extending generally perpendicularly forwardly from the frame; and
   b. connecting a pallet supporting fork structure to said frame to move from a stowed position extending downwardly alongside said side rails to an operating position generally extending forwardly perpendicularly to said frame and spaced above said operative position of the nose plate.

23. The method of construction of claim 22 comprising pivotally mounting said fork structure on the front end of a bell-crank device which is swingably carried on said frame to swing upwardly when said fork structure is to be moved to said stowed position while said fork structure jackknifes downwardly to a position between said side rails.

24. The method of construction of claim 22 comprising providing latching members to extend rearwardly from said fork structure and providing vertically elongate openings in said nose plate to pass said latching members when said nose plate is in said stowed position against said front faces of said side rails and said fork structure is moved to said operative position.

25. A hand truck comprising:
   a. a generally vertical frame having laterally spaced and connected side rails with front and rear faces and laterally inner and outer faces, the frame having an upper handle surface and being carried on spaced apart wheels disposed rearwardly of said side rails and connected with the lower portion of the frame;
   b. a pallet support blade structure configured to be engaged under a pallet support surface having an operative position extending generally forwardly from said lower end of said frame; and
   c. mount mechanism mounting said blade structure for swinging movement upwardly from said operative position while permitting said blade structure to fold downwardly to lie vertically alongside said side rails.

* * * * *